US008693557B1

(12) United States Patent
Zhang et al.

(10) Patent No.: US 8,693,557 B1
(45) Date of Patent: Apr. 8, 2014

(54) AC COUPLED CLOCK RECEIVER WITH COMMON-MODE NOISE REJECTION

(75) Inventors: Liang Leon Zhang, Norcross, GA (US); Alejandro F. Gonzalez, Johns Creek, GA (US)

(73) Assignee: Integrated Device Technology inc., San Jose, CA (US)

( * ) Notice: Subject to any disclaimer, the term of this patent is extended or adjusted under 35 U.S.C. 154(b) by 1285 days.

(21) Appl. No.: 12/497,485

(22) Filed: Jul. 2, 2009

(51) Int. Cl.
*H04L 27/00* (2006.01)

(52) U.S. Cl.
USPC ......................................................... 375/259

(58) Field of Classification Search
USPC ......... 375/257, 259, 261, 294, 295, 316, 354; 327/109, 415, 547
See application file for complete search history.

(56) References Cited

U.S. PATENT DOCUMENTS

| | | | |
|---|---|---|---|
| 4,151,482 A | | 4/1979 | Robe |
| 5,432,944 A | * | 7/1995 | Nuckolls et al. ............... 713/320 |
| 5,574,401 A | | 11/1996 | Spitalny |
| 5,589,785 A | | 12/1996 | Garavan |
| 5,815,034 A | * | 9/1998 | Takahashi ..................... 327/563 |
| 6,762,646 B1 | | 7/2004 | Bell |
| 7,176,720 B1 | * | 2/2007 | Prather et al. .................. 326/80 |
| 7,183,817 B2 | | 2/2007 | Sanchez et al. |
| 7,268,588 B2 | | 9/2007 | Sanchez et al. |
| 2002/0041212 A1 | | 4/2002 | Bruck et al. |
| 2002/0140477 A1 | * | 10/2002 | Zhou et al. ..................... 327/175 |
| 2004/0085137 A1 | | 5/2004 | Furst et al. |
| 2005/0135489 A1 | * | 6/2005 | Ho et al. ........................ 375/257 |
| 2005/0195032 A1 | | 9/2005 | Wang et al. |
| 2006/0132191 A1 | | 6/2006 | Palmer |
| 2006/0165195 A1 | * | 7/2006 | Dally et al. .................... 375/316 |
| 2006/0220741 A1 | | 10/2006 | Jones |

OTHER PUBLICATIONS

Xavier et al. "An 8-Gb/s Capacitively Coupled Receiver With High Common-Mode Rejection for Uncoded Data," IEEE Journal of Solid-State Circuits, vol. 39, No. 11, Nov. 2004.

* cited by examiner

*Primary Examiner* — Sam K Ahn
*Assistant Examiner* — Syed Haider
(74) *Attorney, Agent, or Firm* — Kenneth Glass; Stanley J. Pawlik; Glass & Associates

(57) ABSTRACT

A clock receiver includes a capacitive coupling circuit for filtering out direct-current voltages from a differential clock signal. In this way, the capacitive coupling circuit rejects common-mode noise in the differential clock signal. The clock receiver also includes a bias circuit for establishing a bias voltage in the differential clock signal and a differential amplifier for amplifying the differential clock signal. Further, the differential amplifier generate a feedback differential clock signal and provides the feedback differential clock signal to the bias circuit for further rejecting common-mode noise in the differential clock signal. The feedback differential clock signal functions as a negative feedback signal for rejecting common-mode noise in the differential clock signal and as a positive feedback signal for amplifying the differential clock signal. In some embodiments, the clock receiver includes a capacitive coupling circuit with a cut-off frequency above the frequency of the differential clock signal.

17 Claims, 6 Drawing Sheets

AC COUPLED CLOCK RECEIVER WITH COMMON-MODE NOISE REJECTION

BACKGROUND

A communication system typically includes a transmitter for transmitting a data signal through a communication channel to a receiver of the communication system. In one type of communication system, the transmitter generates a data signal synchronized to a transmit clock signal and transmits the data signal to the receiver. In turn, a clock recovery circuit in the receiver reconstructs the transmit clock signal from the data signal. The receiver then extracts data from the data signal by using the reconstructed clock signal. In this type of communication system, the clock recovery circuit is often complicated which tends to reduce the manufacturing yield of integrated circuits devices containing the receiver. Moreover, the receiver consumes a considerable amount of area and power in an integrated circuit device because the receiver includes the clock recovery circuit.

In another type of communication system, the transmitter transmits a differential data signal and a differential clock signal to the receiver of the communication system. In turn, the receiver extracts data from the differential data signal by using the differential clock signal. Because the receiver does not have a clock recovery circuit in this type of communication system, circuitry in the receiver is less complicated than the circuitry of a receiver including a clock recovery circuit. As a result, the manufacturing yield of integrated circuit devices containing the receiver tends to be higher than those integrated circuit devices containing clock recovery circuits. Moreover, the receiver without the clock recovery circuit consumes less area and power in an integrated circuit in comparison to a receiver including a clock recovery circuit.

Although the receiver in this type of communication system is less complicated and consumes less area and power in an integrated circuit in comparison to receivers in other types of communication systems, the differential clock signal is susceptible to common-mode noise which may cause jitter in a single-ended clock signal generated by the receiver from the differential clock signal. As a result of the jitter in the single-ended clock signal, the receiver may generate data errors by incorrectly extracting data from the data signal. Moreover, the error rate of the receiver generally increases as the frequency of the differential clock signal increases because the jitter in the single-ended clock signal also increases. Therefore, it is desirable to reduce the common-mode noise in the differential clock signal to minimize the data error rate of the receiver.

In light of the above, a need exists for an improved system and method of reducing common-mode noise in a differential clock signal.

SUMMARY

In various embodiments, a clock receiver includes a capacitive coupling circuit for filtering out direct-current voltages from a differential clock signal. In this way, the capacitive coupling circuit rejects common-mode noise in the differential clock signal. The clock receiver also includes a bias circuit for introducing a bias voltage into the differential clock signal and a differential amplifier for amplifying the differential clock signal. Further, the differential amplifier generates a feedback differential clock signal and provides the feedback differential clock signal to the bias circuit for further rejecting common-mode noise in the differential clock signal. As a result, the clock receiver rejects a high level of common-mode noise in the differential clock signal.

A clock receiver, in accordance with one embodiment, rejects common-mode noise in a differential clock signal. The clock receiver includes a capacitive coupling circuit, a bias voltage generator, a bias circuit, and a differential amplifier. The bias circuit is coupled to the capacitive coupling circuit and the bias voltage generator. The differential amplifier is coupled to the bias circuit. The capacitive coupling circuit is configured to receive an input differential clock signal and generate a filtered differential clock signal by high-pass filtering the input differential clock signal. The bias voltage generator is configured to generate a bias voltage. The bias circuit is configured to generate a biased differential clock signal based on the filtered differential clock signal, the bias voltage, and a feedback differential clock signal. The differential amplifier is configured to generate an output differential clock signal by amplifying the biased differential clock signal and to generate the feedback differential clock signal based on the output differential clock signal.

A system, in accordance with one embodiment, rejects common-mode noise in a differential clock. The system includes a transmitter configured to transmit a source differential clock signal and a source data signal. The system also includes a receiver configured to receive the source differential clock signal as an input differential clock signal and to receive the source data signal as an input data signal. The receiver includes a clock receiver, a data receiver, and a synchronizer coupled to the clock receiver and the data receiver. The clock receiver is configured to receive the input differential clock signal, generate a filtered differential clock signal by high-pass filtering the input differential clock signal, and generate a bias voltage. The clock receiver is further configured to generate a biased differential clock signal based on the filtered differential clock signal, the bias voltage, and a feedback differential clock signal. Additionally, the clock receiver is configured to generate an output differential clock signal by amplifying the biased differential clock signal and to generate the feedback differential clock signal based on the output differential clock signal. The data receiver is configured to generate an output data signal based on the input data signal. The synchronizer is configured to generate a synchronized data signal by synchronizing the output data signal with the output differential clock signal.

A method of rejecting common-mode noise in a differential clock signal, in accordance with one embodiment, includes receiving an input differential clock signal. The method further includes generating a filtered differential clock signal by high-pass filtering the input differential clock signal and generating a bias voltage. The method also includes generating a biased differential clock signal based on the filtered differential clock signal, the bias voltage, and a feedback differential clock signal. Further, the method includes generating an output differential clock signal by amplifying the biased differential clock signal and generating the feedback differential clock signal based on the output differential clock signal.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

In various embodiments, a clock receiver filters out a direct-current voltage from a differential clock signal to reject common-mode noise in the differential clock signal. Additionally, the clock receiver amplifies the differential clock signal and generates a feedback differential clock for rejecting common-mode noise in the differential clock signal. The feedback differential clock signal functions as a negative feedback signal for rejecting common-mode noise in the differential clock signal and as a positive feedback signal for amplifying the differential clock signal. As a result, the clock receiver rejects a high level of common-mode noise in the differential clock signal.

Figure 1:
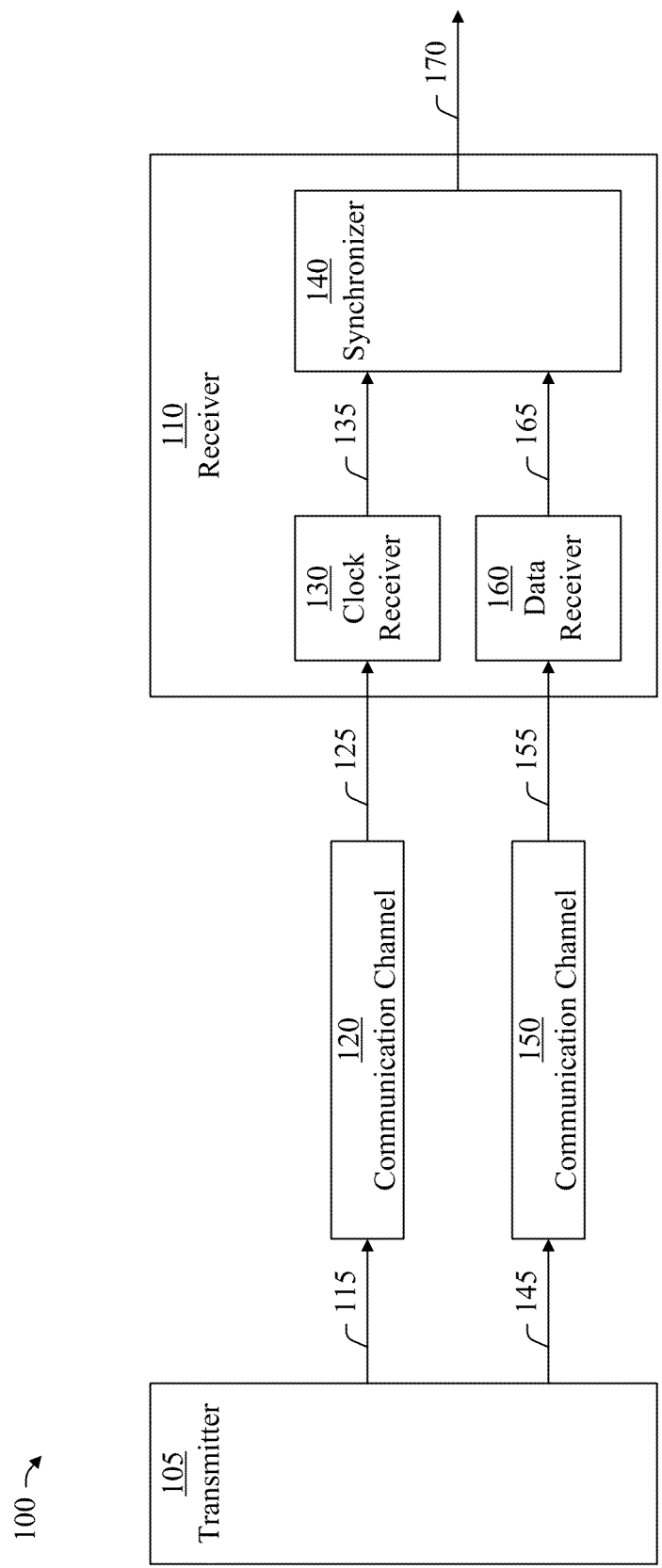
FIG. 1 is a block diagram of a communication system, in accordance with an embodiment of the present invention.

FIG. 1 illustrates a communication system 100, in accordance with an embodiment of the present invention. The communication system 100 includes a transmitter 105 and a receiver 110 coupled in communication with the transmitter 105. The transmitter 105 generates a source differential clock signal 115 and transmits the source differential clock signal 115 to the receiver 110 through a communication channel 120. In turn, the receiver 110 receives the source differential clock signal 115 as an input differential clock signal 125. Additionally, the transmitter 105 generates a source data signal 145 synchronized to the source differential clock signal 115 and transmits the source data signal 145 to the receiver 110 through a communication channel 150. In turn, the receiver 110 receives the source data signal 145 as an input data signal 155. Further, the receiver 110 rejects common-mode noise in the input differential clock signal 125 and generates a synchronized data signal 170 based on the input differential clock signal 125 and the input data signal 155. In this way, the receiver 110 reconstructs the source data signal 145 as the synchronized data signal 170.

In various embodiments, the communication channel 120 may be any medium for transmitting the source differential clock signal 115 to the receiver 110 as the input differential clock signal 125. Similarly, the communication channel 150 may be any medium for transmitting the source data signal 145 to the receiver 110 as the input data signal 155. For example, the communication channel 120 or the communication channel 150, or both, may be shielded cables. In some embodiments, the transmitter 105 adjusts the timing of the source differential clock signal 115 relative to the source data signal 145 so that the input differential clock signal 125 is synchronized with the input data signal 155 at the receiver 110. For example, the transmitter 105 and the receiver 110 may communicate with each other through the communication channels 120 and 150 to synchronize the source data signal 145 with the source differential clock signal 115 by using a training method or calibration method.

As illustrated in FIG. 1, the receiver 110 includes a clock receiver 130, a synchronizer 140, and a data receiver 160. The synchronizer 140 is coupled (e.g., connected) to the clock receiver 130 and the data receiver 10. The clock receiver 130 receives the input differential clock signal 125 and generates an output differential clock signal 135 based on the input differential clock signal 125. Moreover, the clock receiver 130 generates the output differential clock signal 135 by rejecting common-mode noise in the input differential clock signal 125. The data receiver 160 generates an output data signal 165 based on the input data signal 155. Further, the synchronizer 140 generates the synchronized data signal 170 by synchronizing the output data signal 165 to the output differential clock signal 135. For example, the synchronizer 140 may generate the synchronized data signal 170 including a single-ended clock signal based on the output differential clock signal 135 and a single-ended data signal based on the output data signal 165. As another example, the synchronizer 140 may pass the output differential clock signal 135 and the output data signal 165 as the synchronized data signal 170.

In some embodiments, the synchronizer 140 functions to regenerate the output data signal 165. For example, the voltage of the output data signal 165 may not be a rail-to-rail voltage and the synchronizer 140 may generate the synchronized data signal 170 having a rail-to-rail voltage. In some embodiments, the synchronizer 140 may modify the rise and fall rates of the output data signal 165. For example, the synchronizer may generate the synchronized data signal 170 having faster rise and fall rates than the output data signal 165.

In various embodiments, the source data signal 145 and the input data signal 155 are differential signals. In some embodiments, the output data signal 165 is a differential data signal. In other embodiments, the output data signal 165 is a single-ended data signal. In some embodiments, the data receiver 160 generates the output data signal 165 by buffering the input data signal 155. In some embodiments, the data receiver 160 generates the output data signal 165 by rejecting noise (e.g., common-mode noise) in the input data signal 155.

In some embodiments, the clock receiver 130 is implemented in an integrated circuit and may include an integrated circuit package containing the integrated circuit. In some embodiments, the receiver 110 is implemented in an integrated circuit and may include an integrated circuit package containing the integrated circuit. In other embodiments, the receiver 110 or the clock receiver 130, or both, may be implemented in more than one integrated circuit and may include a multichip package containing the integrated circuits.

Figure 2:
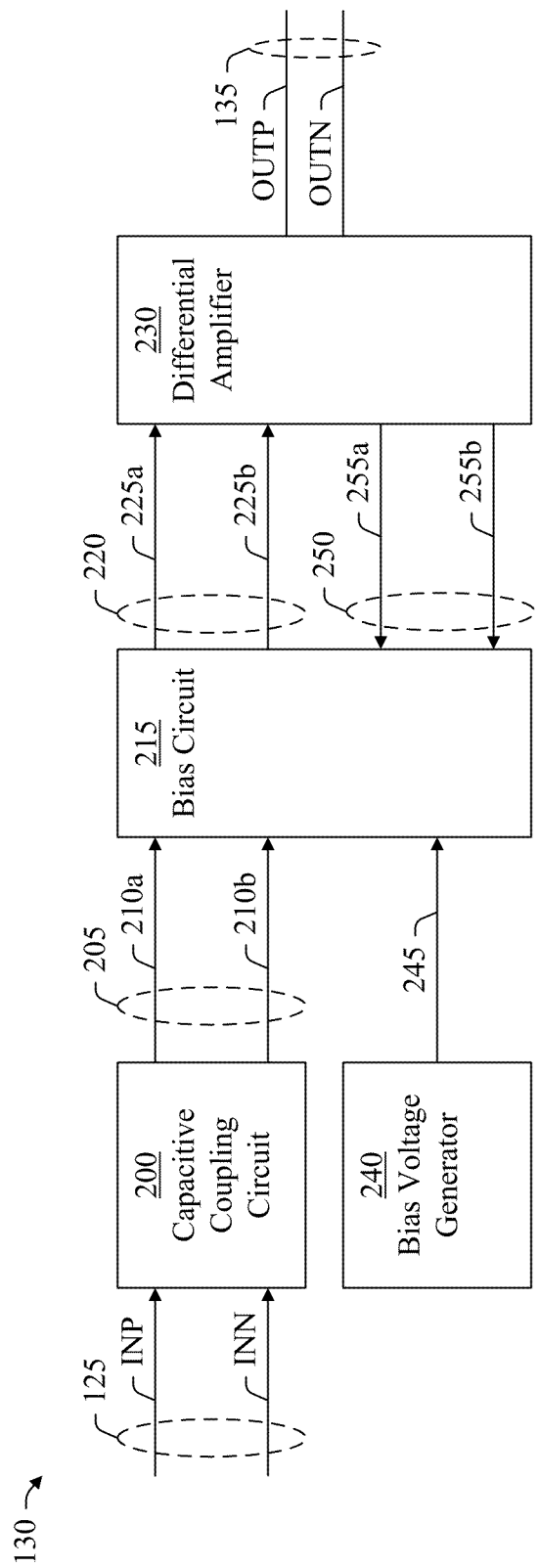
FIG. 2 is a block diagram of a clock receiver, in accordance with an embodiment of the present invention.

FIG. 2 is a block diagram of the clock receiver 130, in accordance with an embodiment of the present invention. The clock receiver 130 includes a capacitive coupling circuit 200, a bias circuit 215, a differential amplifier 230, and a bias voltage generator 240. The bias circuit 215 is coupled (e.g., connected) to the capacitive coupling circuit 200, the differential amplifier 230, and the bias voltage generator 240. In various embodiments, the capacitive coupling circuit 200 is an alternating-current (AC) coupling circuit. In operation, the capacitive coupling circuit 200 receives the input differential clock signal 125, which includes a component signal INP (i.e., a positive component signal) and a component signal INN (i.e., a negative component signal). In various embodiments, the component signal INP and the component signal INN in combination indicate a differential voltage (e.g., a peak-to-peak differential voltage) in the input differential clock signal 125. Moreover, the capacitive coupling circuit 200 generates a filtered differential clock signal 205 by high-pass filtering the input differential clock signal 125. In this way, the capacitive coupling circuit 200 filters out lower-frequency components (e.g., DC frequency components) of the input differential clock signal 125 and passes higher frequency components of the input differential clock signal 125.

As illustrated in FIG. 2, the capacitive coupling circuit 200 provides the filtered differential clock signal 205, which includes a component signal 210a (i.e., a positive component signal) and a component signal 210b (i.e., a negative component signal), to the bias circuit 215. In various embodiments, the component signal 210a and the component signal 210b in combination indicate a differential voltage in the filtered differential clock signal 205.

The bias voltage generator 240 generates a bias voltage 245 and provides the bias voltage 245 to the bias circuit 215. In various embodiments, the bias voltage 245 is a direct-current (DC) bias voltage. In turn, the bias circuit 215 generates a biased differential clock signal 220 based on the filtered differential clock signal 205, the bias voltage 245, and a feedback differential clock signal 250. The biased differential clock signal 220 includes a component signal 225a (i.e., a positive component signal) and a component signal 225b (i.e., a negative component signal). In various embodiments, the component signal 225a and the component signal 225b in combination indicate a differential voltage in the biased differential clock signal 220. Moreover, the biased differential clock signal 220 has a common-mode voltage substantially the same as the bias voltage 245. In this way, the bias circuit 215 establishes the bias voltage 245 as the common-mode voltage of the biased differential clock signal 220. Moreover, the bias circuit 215 generates the biased differential clock signal 220 by rejecting common-mode noise in the filtered differential clock signal 205 based on the feedback differential clock signal 250. In this way, the bias circuit 215 further rejects common-mode noise in the input differential clock signal 125.

As illustrated in FIG. 2, the feedback differential clock signal 250 includes a component signal 255a and a component signal 255b. In various embodiments, the component signal 255a and the component signal 255b in combination indicate a differential voltage in the biased differential clock signal 250.

The differential amplifier 230 generates the output differential clock signal 135, which includes a component signal OUTP (i.e., a positive component signal) corresponding to the component signal INN and a component signal OUTN (i.e., a negative component signal) corresponding to the component signal INP. In this way, the differential amplifier 230 inverts the input differential clock signal 125. In various embodiments, the component signal OUTP and the component signal OUTN in combination indicate a differential voltage (e.g., a peak-to-peak differential voltage) in the output differential clock signal 135.

Figure 3:
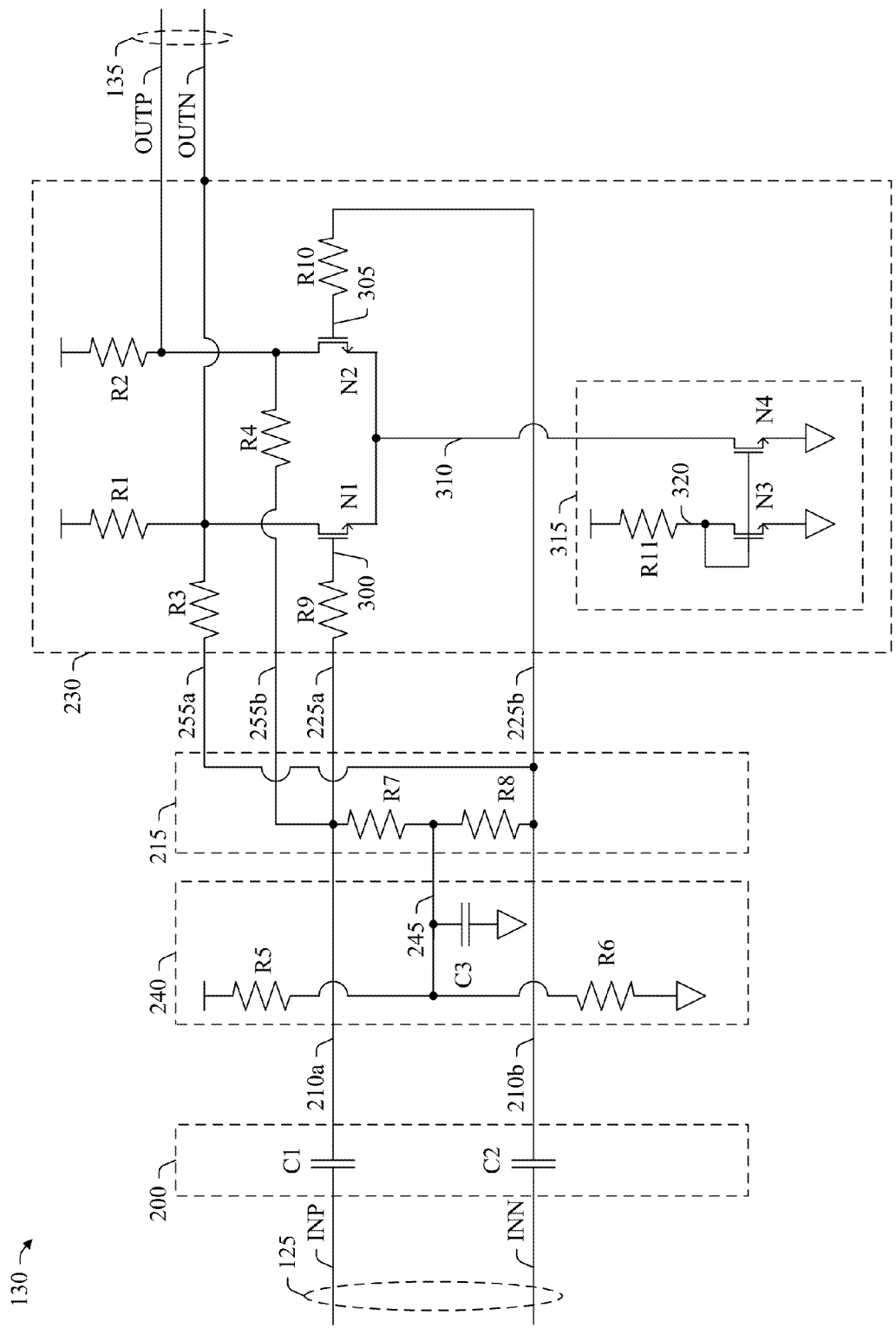
FIG. 3 is a schematic diagram of a clock receiver, in accordance with an embodiment of the present invention.

FIG. 3 is a schematic diagram of the clock receiver 130, in accordance with an embodiment of the present invention. In this embodiment, the capacitive coupling circuit 200 includes a capacitor C1 and a capacitor C2. One end of the capacitor C1 receives the component signal INP and the other end of the capacitor C1 outputs the component signal 210a of the filtered differential clock signal 205. Similarly, one end of the capacitor C2 receives the component signal INN and the other end of the capacitor C2 outputs the component signal 210b of the filtered differential clock signal 205.

In operation, the capacitors C1 and C2 perform a high-pass filtering function on the input differential clock signal 125 to filter out lower frequency components from the component signal INP and the component signal INN of the input differential clock signal 125. Further, the capacitors C1 and C2 pass higher frequency components of the component signal INP and the component signal INN of the input differential clock signal 125 as the respective component signal 210a and the component signal 210b of the filtered differential clock signal 205. In this way, the capacitive coupling circuit 200 rejects common-mode noise in the input differential clock signal 125 and reduces common-mode noise in the filtered differential clock signal 205.

The bias voltage generator 240 includes a resistor R5, a resistor R6, and a capacitor C3. One end of the resistor R5 is coupled to a supply voltage of the clock receiver 130. The other end of the resistor R5 is connected to one end of the resistor R6 and one end of the capacitor C3 at a junction (e.g., an electrical connection). The other end of the resistor R6 and the other end of the capacitor C3 are connected to a ground potential of the clock receiver 130. As illustrated in FIG. 3, the bias voltage generator 240 generates the bias voltage 245 at the junction connecting the resistor R5, the resistor R6, and the capacitor C3. In operation, the resistor R5 and the resistor R6 in combination form a voltage divider for generating the bias voltage 245 by dividing the supply voltage. In turn, the capacitor C3 maintains the bias voltage 245, for example by filtering out higher frequency components from the supply voltage. In various embodiments, the capacitor C3 maintains the bias voltage 245 effectively at an AC ground potential for higher frequencies of the input differential clock signal 125.

The bias circuit 215 includes a resistor R7 and a resistor R8. One end of the resistor R7 receives the bias voltage 245 and is connected to one end of the resistor R8. The other end of the resistor R7 receives the component signal 210a of the filtered differential clock signal 205 and a component signal 255b of the feedback differential clock signal 250 and generates the component signal 225a of the biased differential clock signal 220. Moreover, the component signal 225a includes the component signal 210a and the component signal 255b. The end of resistor R8 connected to the resistor R7 receives the bias voltage 245. The other end of the resistor R8 receives a component signal 210b of the filtered differential clock signal 205 and a component signal 255a of the feedback differential clock signal 250 and generates the component signal 225b of the biased differential clock signal 220. Moreover, the component signal 225b includes the component signal 210b and the component signal 255a.

In operation, the bias circuit 215 generates the biased differential clock signal 220 having a common-mode voltage being the same as the bias voltage 245. In this way, the bias circuit 215 establishes the bias voltage 245 as the common-mode voltage of the biased differential clock signal 220. Moreover, the resistor R7 and the resistor R8 in combination generate the component signals 225a and 225b of the biased differential clock signal 220 by rejecting common-mode noise in the component signals 210a and 210b of the filtered differential clock signal 205 based on the component signals 255a and 255b of the feedback differential clock signal 250.

In various embodiments, the resistor R7 generates the component signal 225a of the biased differential clock signal 220 by rejecting common-mode noise in the component signal 210a of the filtered differential clock signal 205 based on the component signal 255b of the feedback differential clock signal 250. In this way, the component signal 255b of the feedback differential clock signal 250 functions as a positive feedback for the component signal 225a of the biased differential clock signal 220 and a negative feedback for the common-mode voltage of the biased differential clock signal 220. Similarly, the resistor R8 generates the component signal 225b of the biased differential clock signal 220 by rejecting common-mode noise in the component signal 210b of the filtered differential clock signal 205 based on the component signal 255a of the feedback differential clock signal 250. In this way, the component signal 255a of the feedback differential clock signal 250 functions as a positive feedback for the component signal 225b of the biased differential clock signal 220 and a negative feedback for the common-mode voltage of the biased differential clock signal 220.

In the embodiment of FIG. 3, the differential amplifier 230 includes resistors R1 and R2 (e.g., a pullup resistors), resistors R3 and R4 (e.g., feedback resistors), resistors R9 and R10 (e.g., protection resistors), transistors N1 and N2, and a current source 315. One end of the resistor R1 is connected to the supply voltage of the clock receiver 130. The other end of the resistor R1 is connected to one end of the resistor R3 and a drain of the transistor N1 at a junction (e.g., an electrical connection). The drain of the transistor N1 generates the component signal OUTN of the output differential clock signal 135. Moreover, the other end of the resistor R3 generates the component signal 255a of the feedback differential clock signal 250. In some embodiments, the resistors R1-R4 or the resistors R9 and R10 include components other than conventional resistors. For example, the resistor R1 may be a PMOS (p-type metal-oxide-semiconductor) transistor having both a source and a gate connected to the supply voltage and a drain connected to the drain of the transistor N1. In other embodiments, the resistors R1-R4 may be other types of pull-up circuits.

One end of the resistor R2 is connected to the supply voltage of the clock receiver 130. The other end of the resistor R2 is connected to one end of the resistor R4 and a drain of the transistor N2 at a junction (e.g., an electrical connection). The drain of the transistor N2 generates the component signal OUTP of the output differential clock signal 135. Moreover, the other end of the resistor R4 generates the component signal 255b of the feedback differential clock signal 250.

One end of the resistor R9 receives the component signal 225a of the biased differential clock signal 220 and the other end of the resistor R9 is connected to a gate of the transistor N1. Further, the resistor R9 generates an input clock signal 300 (e.g., a positive input clock signal) based on the component signal 225a of the biased differential clock signal 220 and provides the input clock signal 300 to the gate of the transistor N1. The resistor R9 limits current in the input clock signal 300. In this way, the resistor R9 provides electrostatic discharge (ESD) protection to the transistor N1.

One end of the resistor R10 receives the component signal 225b of the biased differential clock signal 220 and the other end of the resistor R10 is connected to a gate of the transistor N2. Further, the resistor R10 generates an input clock signal 305 (e.g., a negative input clock signal) based on the component signal 225b of the biased differential clock signal 220 and provides the input clock signal 305 to the gate of the transistor N2. The resistor R10 limits current in the input clock signal 305. In this way, the resistor R10 provides electrostatic discharge (ESD) protection to the transistor N2.

The current source 315 is connected to a source of the transistor N1 and a source of the transistor N2. Moreover, the current source 315 generates a bias current 310 having a portion flowing through the source of the transistor N1 and a portion flowing through the source of the transistor N2. The current source 315 may be any circuit for generating the bias current 310 and maintaining the bias current 310 substantially constant.

In one embodiment, the current source 315 includes a resistor R11, a transistor N3, and a transistor N4 as illustrated in FIG. 3. One end of the resistor R11 is connected to the supply voltage of the clock receiver 130 and the other end of the resistor R1 is connected to both a drain and a gate of the transistor N3. Additionally, the transistor N3 has a source connected the ground potential of the clock receiver 130. The transistor N4 has a gate connected to both the gate and the drain of the transistor N3. A source of the transistor N4 is connected to the ground potential of the clock receiver 130. Further, the transistor N4 has a drain for generating the bias current 310. The resistor R11 and the transistor N3 in combination generate a source current 320 flowing through the resistor R11. In turn, the transistor N4 generates the bias current 310 such that the bias current 310 is substantially the same as the source current 320. In this way, the current source 315 generates the bias current 310 by mirroring the source current 320. In other embodiments, the transistor N4 generates the bias current 310 by scaling the source current 320.

In operation, the differential amplifier 230 generates the component signal OUTP of the output differential clock signal 135 by amplifying and inverting the component signal 225b of the biased differential clock signal 220. Additionally, the differential amplifier 230 generates the component signal OUTN of the output differential clock signal 135 by amplifying and inverting the component signal 225a of the biased differential clock signal 220. Further, the differential amplifier 230 generates the component signal 255a of the feedback differential clock signal 250 based on the component signal OUTN. Additionally, the differential amplifier 230 generates the component signal 255b of the feedback differential clock signal 250 based on the component signal OUTP. In this way, the differential amplifier 230 generates a cross-coupled feedback differential clock signal (i.e., the feedback differential clock signal 250).

In various embodiments, the clock receiver 130 is implemented in an integrated circuit and the transistors N1 and N2 are N-type metal-oxide-semiconductor (NMOS) transistors. In one embodiment, each of the capacitors C1 and C2 has a capacitance of one picofarad (1 pf) and the capacitor C3 has a capacitance of ten picofarads (10 pf). For example, the capacitors C1-C3 may be metal-to-metal capacitors, such as interdigitated capacitors having metal fingers. Further in this embodiment, each of the resistors R1 and R2 has a resistance of 1,500 ohms (1.5 kilo-ohms), each of the resistors R3 and R4 has a resistance of 2,500 ohms (2.5 kilo-ohms), and each of the resistors R5 and R6 has a resistance of 5,200 ohms (5.2 kilo-ohms). Additionally, each of the resistors R7 and R8 has a resistance of five-hundred ohms (500 ohms), each of the resistors R9 and R10 has a resistance of two-hundred ohms (200 ohms), and the resistor R11 has a resistance of ten-thousand ohms (10 kilo-ohms).

In various embodiments, the capacitors C1 and C2 of the capacitive coupling circuit 200 in combination with the resistors R7 and R8 of the bias circuit 215 determine a cutoff coupling frequency (e.g., a cutoff alternating-current coupling frequency) for rejecting (e.g., suppressing) common-mode noise in the input differential clock signal 125. In these embodiments, the cutoff frequency may be computed by multiplying the capacitance of the capacitors C1 and C2 by the resistance of the resistors R7 and R8, and taking the reciprocal of the result. For example, each of the capacitors C1 and C2 may have a capacitance of one picofarad (1 pf) and each of the resistors R7 and R8 may have a resistance of five-hundred ohms (500 ohms). In this example, the cutoff coupling frequency may be computed to be two gigahertz (2 GHz).

In one embodiment, the clock receiver 130 is implemented in an integrated circuit manufactured by using a ninety nanometer complimentary metal-oxide-semiconductor (CMOS) process (90 nm). In this embodiment, the clock receiver 130 is capable of receiving the input differential clock signal 125 having a frequency in a range of six-hundred sixty-seven megahertz (667 MHz) to three-thousand two-hundred megahertz (3.2 GHz) and the cutoff coupling frequency of the capacitive coupling circuit 200 is two gigahertz (2 GHz). Although the frequency of the input differential clock signal 125 may be less than the cut-off frequency of the capacitive coupling circuit 200, the clock receiver 130 functions to generate the output differential clock signal 135 having the same frequency as the input differential clock signal 125. In this process, the capacitive coupling circuit 200 generates the filtered differential clock signal 205 by attenuating the input differential clock signal 125 and the differential amplifier 230 amplifies the biased differential clock signal 220 based on positive feedback of the feedback differential clock signal 250.

In one embodiment, the clock receiver 130 has a common-mode rejection ratio (CMRR) of twenty decibels (20 db) at a typical process corner of a semiconductor device containing the clock receiver 130. In various embodiments, the capacitance values of the capacitors C1 and C2 in the capacitive coupling circuit 200 and the resistance values of the resistors R7 and R8 in the bias circuit 215 are selected such that the cutoff coupling frequency of the clock receiver 130 is as low as one-third of the frequency of the input differential clock signal 125. In various embodiments, the clock receiver 130 filters out common-mode noise in a two-hundred to two-hundred fifty megahertz frequency band (200-250 MHz) over a frequency range of the input differential clock signal 125 from six-hundred sixty-seven megahertz to three-thousand two-hundred megahertz (667 MHz-3.2 GHz).

Figure 4:
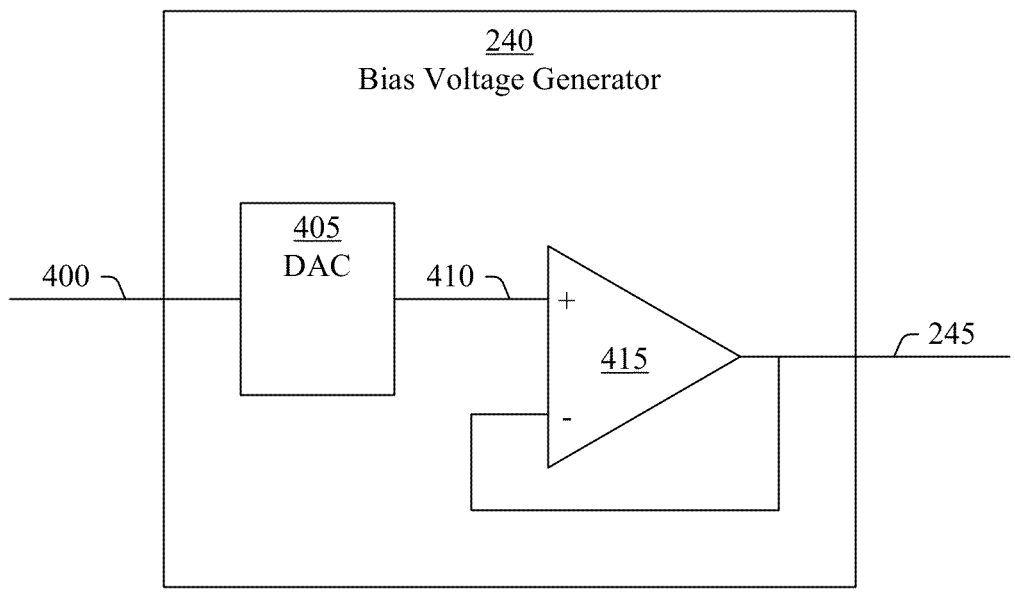
FIG. 4 is a schematic diagram of a bias voltage generator, in accordance with an embodiment of the present invention.

FIG. 4 illustrates the bias voltage generator 240, in accordance with an embodiment of the present invention. The bias voltage generator 240 includes a digital-to-analog converter (DAC) 405 and an operational amplifier 415 coupled (e.g., connected) to the digital-to-analog converter 405. The digital-to-analog converter 405 receives a control signal 400 and generates a control voltage 410 based on the control signal 400. In this way, the control signal 400 indicates the control voltage 410.

The operational amplifier 415 includes a positive input (+) and a negative input (−). Moreover, the operational amplifier 415 receives the control voltage 410 at the positive input and receives the direct-current bias voltage 245 at the negative input. In this way, the operational amplifier 415 receives the direct-current bias voltage 245 at the negative input in a negative feedback loop. The operational amplifier 415 generates the direct-current bias voltage 245 based on the control voltage 410 and the direct-current bias voltage 245 received in the negative feedback loop. In various embodiments, the operational amplifier 415 functions as a voltage follower having a unity voltage gain.

Figure 5:
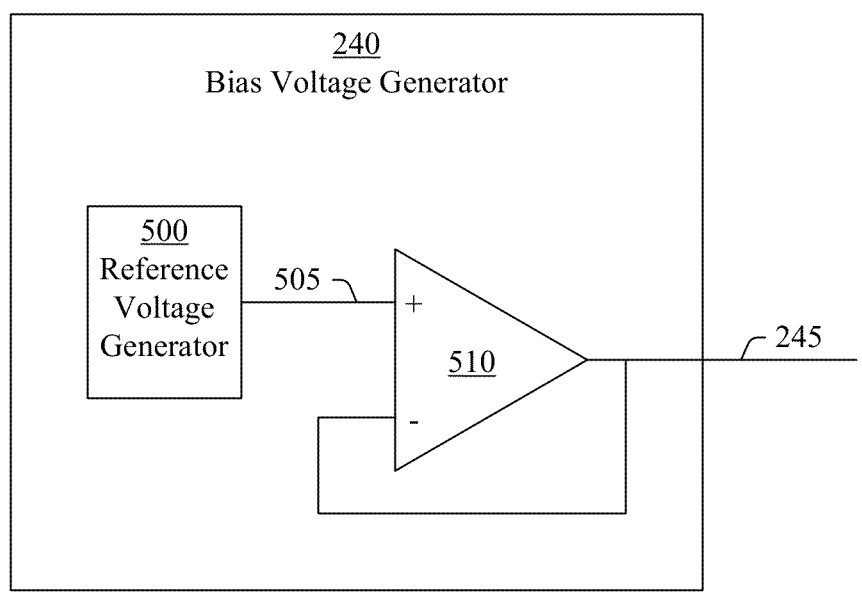
FIG. 5 is a schematic diagram of a bias voltage generator, in accordance with an embodiment of the present invention.

FIG. 5 illustrates the bias voltage generator 240, in accordance with an embodiment of the present invention. The bias voltage generator 240 includes a reference voltage generator 500 and an operational amplifier 510 coupled (e.g., connected) to the reference voltage generator 500. The reference voltage generator 500 generates a reference voltage 505 and provides the reference voltage 505 to the operational amplifier 510. In some embodiments, the reference voltage generator 500 includes a bandgap reference voltage circuit for generating the reference voltage 505.

The operational amplifier 510 includes a positive input (+) and a negative input (−). Moreover, the operational amplifier 510 receives the reference voltage 505 at the positive input and receives the direct-current bias voltage 245 at the negative input. In this way, the operational amplifier 510 receives the direct-current bias voltage 245 at the negative input in a negative feedback loop. The operational amplifier 510 generates the direct-current bias voltage 245 based on the reference voltage 505 and the direct-current bias voltage 245 received in the negative feedback loop. In various embodiments, the operational amplifier 510 functions as a voltage follower having a unity voltage gain.

Figure 6:
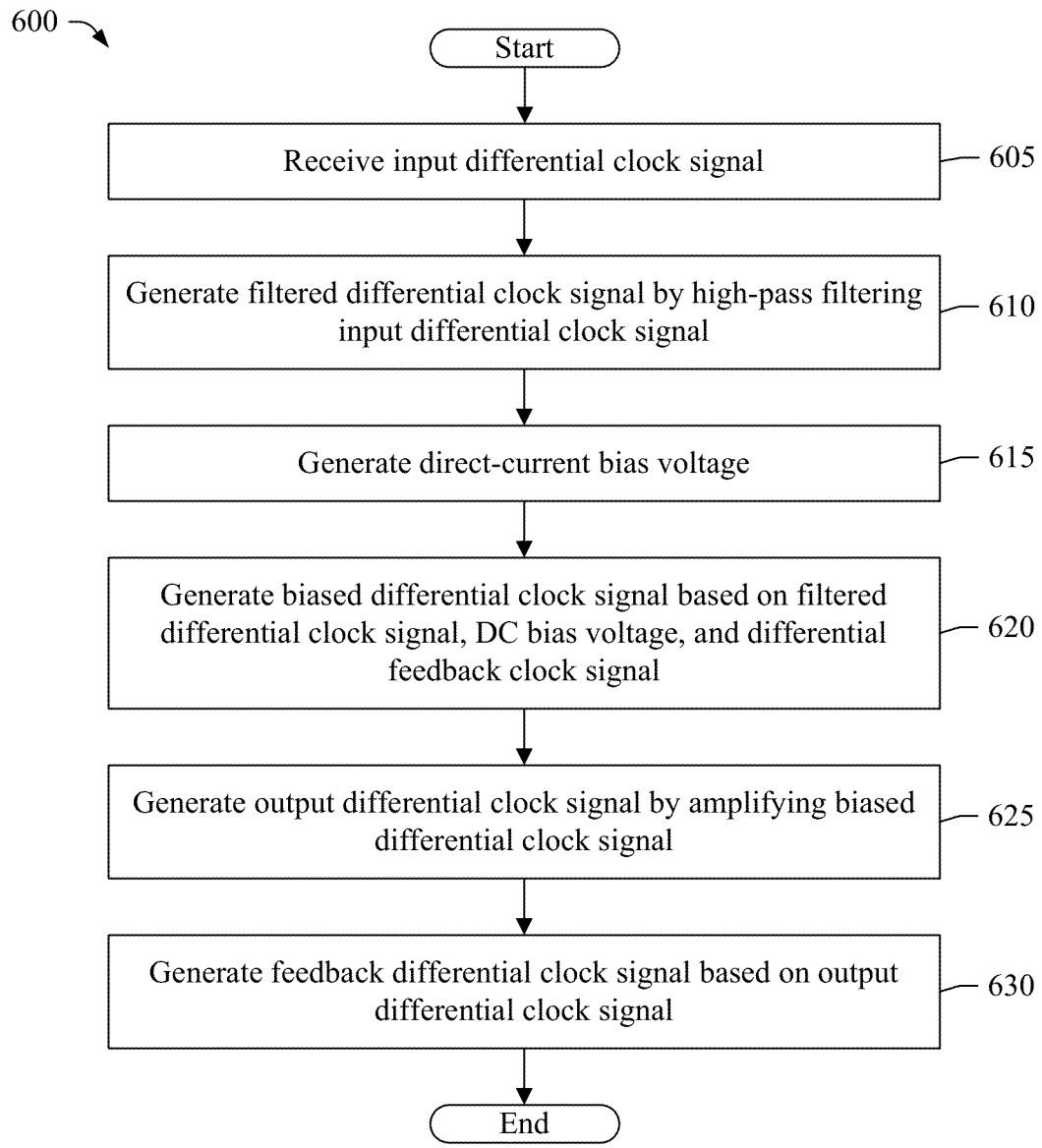
FIG. 6 is a flow chart of a method of rejecting common-mode noise in a differential clock signal, in accordance with an embodiment of the present invention.

FIG. 6 illustrates a method 600 of rejecting common-mode noise in a differential clock signal, in accordance with an embodiment of the present invention. In step 605, an input differential clock signal is received. In various embodiments, the clock receiver 130 receives the input differential clock signal 125. In some embodiments, the transmitter 105 generates the source differential clock signal 115 and transmits the source differential clock signal 115 to the receiver 110. In turn, the clock receiver 130 of the receiver 110 receives the source differential clock signal 115 as the input differential clock signal 125. The method 600 then proceeds to step 610.

In step 610, a filtered differential clock signal is generated by high-pass filtering the input differential clock signal. In various embodiments, the clock receiver 130 generates the filtered differential clock signal 205 by high-pass filtering the input differential clock signal 125. In some embodiments, the capacitive coupling circuit 200 generates the filtered differential clock signal 205 by passing frequencies of the input differential clock signal 125 above a cutoff coupling frequency and rejecting (e.g., suppressing) frequencies of the input differential clock signal 125 below the cutoff coupling frequency. The method 600 then proceeds to step 615.

In step 615, a bias voltage is generated. In various embodiments, the bias voltage generator 240 generates the bias voltage 245. For example, the bias voltage generator 240 may generate the bias voltage 245 having a voltage of one-half the supply voltage of the clock receiver 130. The method 600 then proceeds to step 620.

In step 620, a biased differential clock signal is generated based on the filtered differential clock signal, the bias voltage, and a feedback differential clock signal. In various embodiments, the clock receiver 130 generates the biased differential clock signal 220 based on the filtered differential clock signal 205, the bias voltage 245, and the feedback differential clock signal 250. In some embodiments, the bias circuit 215 of the clock receiver 130 generates the biased differential clock signal 220. In these embodiments, the bias circuit 215 generates the component signal 225a of the biased differential clock signal 220 based on the bias voltage 245, the component signal 210a of the filtered differential clock signal 205, and the component signal 255b of the feedback differential clock signal 250. Additionally, the bias circuit 215 generates the component signal 225b of the biased differential clock signal 220 based on the bias voltage 245, the component signal 210b of the filtered differential clock signal 205, and the component signal 255a of the feedback differential clock signal 250. The method 600 then proceeds to step 625.

In step 625, an output differential clock signal is generated by amplifying the biased differential clock signal. In various embodiments, the clock receiver 130 generates the output differential clock signal 135 by amplifying the biased differential clock signal 220. In some embodiments, the differential amplifier 230 of the clock receiver 130 generates the output differential clock signal 135. In these embodiments, the differential amplifier 230 generates the component signal OUTP of the output differential clock signal 135 by amplifying and inverting the component signal 225b of the biased differential clock signal 220 and generates the component signal OUTN of the output differential clock signal 135 by amplifying and inverting the component signal 225a of the biased differential clock signal 220. The method 600 then proceeds to step 630.

In step 630, the feedback differential clock signal is generated based on the output differential clock signal. In various embodiments, the clock receiver 130 generates the feedback differential clock signal 250 based on the output differential clock signal 135. In some embodiments, the differential amplifier 230 of the clock receiver 130 generates the feedback differential clock signal 250. In these embodiments, the differential amplifier 230 generates the component signal 255a based on the component signal OUTN of the output differential clock signal 135. Additionally, the differential amplifier 230 generates the component signal 255b based on the component signal OUTP of the output differential clock signal 135. The method 600 then ends.

In various embodiments, the method 600 may include more or fewer steps than the steps 605-630 described above and illustrated in FIG. 6. In some embodiments, one or more of the steps 605-630 of the method 600 may be performed in parallel or substantially simultaneously. For example, steps 610 and 615 may be performed in parallel. In various embodiments, the steps 605-630 of the method 600 may be performed more than once or in a different order than the order described above and illustrated in FIG. 6. For example, step 615 may be performed before step 605.

Figure 7:
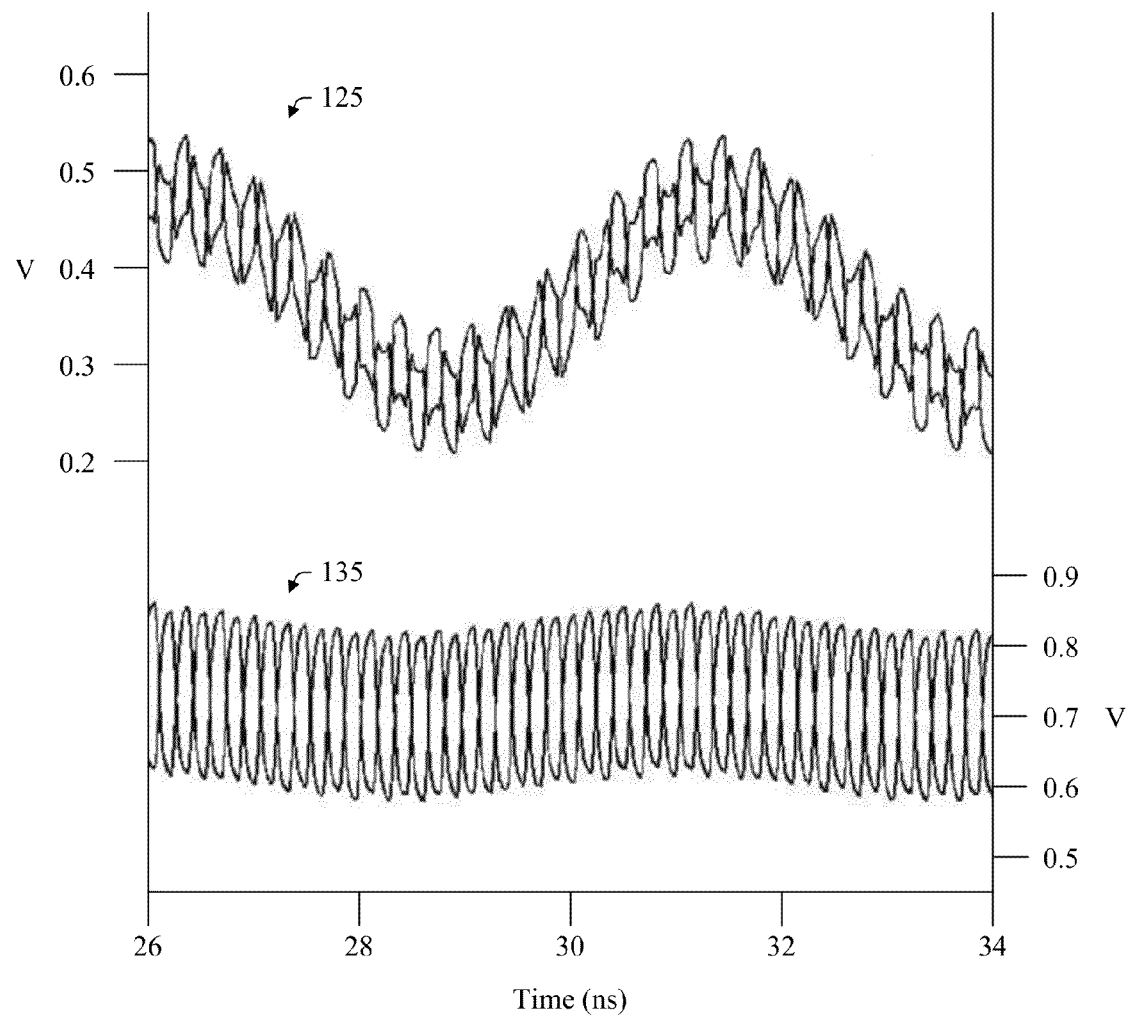
FIG. 7 is a timing diagram of signals in a clock receiver, in accordance with an embodiment of the present invention.

FIG. 7 illustrates signals in the clock receiver 130, in accordance with an embodiment of the present invention. The signals illustrated in FIG. 7 include an exemplary input differential clock signal 125 and an exemplary output differential clock signal 135. As is also illustrated in FIG. 7, the input differential clock signal 125 has a peak-to-peak differential voltage of approximately 0.2 volts (0.2V) and a common-mode voltage range of approximately 0.25 volts (0.25V). The output differential clock signal 135 has a peak-to-peak differential voltage of approximately 0.4 volts (0.4V) and a common-mode voltage range of approximately 0.05 volts (0.05V). Moreover, both the differential input clock signal 125 and the differential output clock signal 135 have a frequency of approximately 3.2 gigahertz (3.2 GHz).

The differential gain of the clock receiver 130 may be computed by dividing the peak-to-peak differential voltage of the differential output clock signal 135 by the peak-to-peak differential voltage of the input differential clock signal 125 (e.g., 0.4V/0.2V). Thus the differential gain of a clock receiver 130 generating the differential output signal 135 of FIG. 7 based on the differential input signal 125 of FIG. 7 is approximately 2.0. The common-mode gain of the clock receiver 130 may be computed by dividing the common-mode voltage range of the output differential clock signal 135 by the common-mode voltage range of the input differential clock signal 125 (e.g., 0.05V/0.25V). Thus the common-mode gain of a clock receiver 130 generating the differential output signal 135 of FIG. 7 based on the differential input signal 125 of FIG. 7 is approximately 0.2. Moreover, the common-mode rejection ratio (CMRR) of the clock receiver 130 may be computed by multiplying 20 times the base 10 logarithm of the result of dividing the differential gain by the common-mode gain (e.g., $20 \log_{10}(2.0/0.2)$). Thus the common-mode rejection ratio of the clock receiver 130 generating the differential output signal 135 of FIG. 7 based on the differential input signal 125 of FIG. 7 is approximately 20 decibels (20 dB).

In various embodiments, the clock receiver 130 of the communication system 100 generates the output differential clock signal 135 by suppressing (e.g., reducing) common-mode noise in the input differential clock signal 125. In these embodiments, the clock receiver 130 receives the input differential clock signal 125 and generates the filtered differential clock signal 205 by high-pass filtering the input differential clock signal 125. In this way, the clock receiver 130 rejects common-mode noise in the input differential clock signal 125. Additionally, the clock receiver 130 generates the biased differential clock signal 220 by introducing the bias voltage 245 into the filtered differential clock signal 205 and suppressing (e.g., reducing) common-mode noise in the filtered differential clock signal 205 based on the feedback differential clock signal 250. In this way, the clock receiver 130 further rejects common-mode noise in the input differential clock signal 125 based on a cross-coupled negative feedback differential clock signal (i.e., the feedback differential clock signal 250). Moreover, the clock receiver 130 generates the output differential clock signal 135 by amplifying the biased differential clock signal 220 based on a cross-coupled positive feedback differential clock signal (i.e., the feedback differential clock signal 250). In this way, the clock receiver 130 generates the output differential clock signal 135 based on the input differential clock signal 125 and has a high common-mode rejection ratio (e.g., a common-mode rejection ratio of 20 db).

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A clock receiver for rejecting common-mode noise in a differential clock signal, the clock receiver comprising:
   a capacitive coupling circuit configured to receive an input differential clock signal and generate a filtered differential clock signal by high-pass filtering the input differential clock signal;
   a bias voltage generator configured to generate a bias voltage;
   a bias circuit coupled to the capacitive coupling circuit and the bias voltage generator, the bias circuit including a first resistor having a first end configured to receive a first component signal of the filtered differential clock signal and a second end configured to receive the bias voltage and a second resistor having a first end coupled to the second end of the first resistor and configured to receive the bias voltage and a second end configured to receive a second component signal of the filtered differential clock signal, the bias circuit configured to generate a biased differential clock signal based on the filtered differential clock signal, the bias voltage, and a feedback differential clock signal; and
   a differential amplifier coupled to the bias circuit, the differential amplifier configured to generate an output differential clock signal by amplifying the biased differential clock signal and to generate the feedback differential clock signal based on the output differential clock signal.

2. The clock receiver of claim 1, wherein the feedback differential clock signal functions as a positive feedback signal for generating the biased differential clock signal and as a negative feedback signal for rejecting common-mode noise in the biased differential clock signal.

3. The clock receiver of claim 1, wherein the bias voltage generator comprises:
   a voltage divider configured to generate the bias voltage; and
   a capacitor coupled to the voltage divider and configured to maintain the bias voltage.

4. A clock receiver for rejecting common-mode noise in a differential clock signal, the clock receiver comprising:

a capacitive coupling circuit configured to receive an input differential clock signal and generate a filtered differential clock signal by high-pass filtering the input differential clock signal;

a bias voltage generator configured to generate a bias voltage;

a bias circuit coupled to the capacitive coupling circuit and the bias voltage generator, the bias circuit configured to generate a biased differential clock signal based on the filtered differential clock signal, the bias voltage, and a feedback differential clock signal; and a differential amplifier coupled to the bias circuit, the differential amplifier configured to generate an output differential clock signal by amplifying the biased differential clock signal and to generate the feedback differential clock signal based on the output differential clock signal, the differential amplifier including a first transistor configured to generate a first component signal of the output differential clock signal by amplifying and inverting a first component signal of the biased differential clock signal, a second transistor configured to generate a second component signal of the output differential clock signal by amplifying and inverting a second component signal of the biased differential clock signal, a first resistor coupled to the first transistor and configured to generate a first component signal of the feedback differential clock signal based the first component signal of the output differential clock signal for rejecting common-mode noise in the second component signal of the biased differential clock signal, and a second resistor coupled to the second transistor and configured to generate a second component signal of the feedback differential clock signal based on the second component signal of the output differential clock signal for rejecting common-mode noise in the first component signal of the biased differential clock signal.

5. The clock receiver of claim 4, wherein the first transistor and the second transistor are n-type metal-oxide-semiconductor transistors.

6. The clock receiver of claim 1, wherein the input differential clock signal has a frequency being less than a cut-off frequency of the capacitive coupling circuit.

7. A communication system for rejecting common-mode noise in a differential clock signal, the system comprising:

a transmitter configured to transmit a source differential clock signal and a source data signal; and a receiver coupled in communication with the transmitter and configured to receive the source differential clock signal as an input differential clock signal and to receive the source data signal as an input data signal, the receiver comprising:

a clock receiver configured to receive the input differential clock signal, generate a filtered differential clock signal by high-pass filtering the input differential clock signal, generate a bias voltage, and generate a biased differential clock signal based on the filtered differential clock signal, the bias voltage, and a feedback differential clock signal, the clock receiver further configured to generate an output differential clock signal by amplifying the biased differential clock signal and to generate the feedback differential clock signal based on the output differential clock signal wherein the clock receiver comprises a bias circuit configured to generate the biased differential clock signal, the bias circuit including a first resistor having a first end configured to receive a first component signal of the filtered differential clock signal and a second end configured to receive the bias voltage and a second resistor having a first end coupled to the second end of the first resistor and configured to receive the bias voltage and a second end configured to receive a second component signal of the filtered differential clock signal;

a data receiver configured to generate an output data signal based on the input data signal; and a synchronizer coupled to the clock receiver and the data receiver, the synchronizer configured to generate a synchronized data signal by synchronizing the output data signal with the output differential clock signal.

8. The communication system of claim 7, wherein the feedback differential clock signal functions as a positive feedback signal for generating the biased differential clock signal and as a negative feedback signal for rejecting common-mode noise in the biased differential clock signal.

9. The communication system of claim 7, wherein the clock receiver comprises a bias voltage generator configured to generate the bias voltage, the bias voltage generator comprising:

a voltage divider configured to generate the bias voltage; and a capacitor coupled to the voltage divider and configured to maintain the bias voltage.

10. The communication system of claim 7, wherein the clock receiver comprises a differential amplifier configured to generate the output differential clock signal and the feedback differential clock signal.

11. The communication system of claim 10, wherein the differential amplifier comprises:

a first transistor configured to generate a first component signal of the output differential clock signal by amplifying and inverting a first component signal of the biased differential clock signal;

a second transistor configured to generate a second component signal of the output differential clock signal by amplifying and inverting a second component signal of the biased differential clock signal;

a third resistor coupled to first transistor and configured to generate a first component signal of the feedback differential clock signal based the first component signal of the output differential clock signal for rejecting common-mode noise in the second component signal of the biased differential clock signal; and a fourth resistor coupled to second transistor and configured to generate a second component signal of the feedback differential clock signal based on the second component signal of the output differential clock signal for rejecting common-mode noise in the first component signal of the biased differential clock signal.

12. The system of claim 7, wherein the input differential clock signal has a frequency being less than a cut-off frequency of the capacitive coupling circuit.

13. A method of rejecting common-mode noise in a differential clock signal, the method comprising:

receiving an input differential clock signal;

generating a filtered differential clock signal by high-pass filtering the input differential clock signal;

generating a bias voltage;

generating a biased differential clock signal based on the filtered differential clock signal, the bias voltage, and a feedback differential clock signal;

generating an output differential clock signal by combining the filtered differential clock signal with the bias voltage to establish the bias voltage as a common-mode voltage of the biased differential clock signal and by amplifying the biased differential clock signal; and generating the feedback differential clock signal based on the output differential clock signal, the feedback differential clock signal operable as a positive feedback signal for generating the biased differential clock signal and as a negative feedback signal for rejecting common-mode noise in the biased differential clock signal.

14. The method of claim 13, wherein the biased differential clock signal comprises a first component signal and a second component signal, and generating the output differential signal comprises:

generating a first component signal of the output differential clock signal by amplifying and inverting a first component signal of the biased differential clock signal; and generating a second component signal of the output differential clock signal by amplifying and inverting a second component signal of the biased differential clock signal.

15. The method of claim 14, wherein generating the feedback differential clock signal comprises:

generating a first component signal of the feedback differential clock signal based the first component signal of the output differential clock signal for rejecting common-mode noise in the second component signal of the biased differential clock signal; and generating a second component signal of the feedback differential clock signal based on the second component signal of the output differential clock signal for rejecting common-mode noise in the first component signal of the biased differential clock signal.

16. The method of claim 13, wherein the input differential clock signal has a frequency being less than a cut-off frequency of the capacitive coupling circuit.

17. A clock receiver for rejecting common-mode noise in a differential clock signal, the clock receiver comprising:

a capacitive coupling circuit configured to receive an input differential clock signal and generate a filtered differential clock signal by high-pass filtering the input differential clock signal;

a bias voltage generator configured to generate a bias voltage;

a bias circuit coupled to the capacitive coupling circuit and the bias voltage generator, the bias circuit configured to generate a biased differential clock signal based on the filtered differential clock signal, the bias voltage, and a feedback differential clock signal; and a differential amplifier coupled to the bias circuit, the differential amplifier configured to generate an output differential clock signal by amplifying the biased differential clock signal and to generate the feedback differential clock signal based on the output differential clock signal, the feedback differential clock signal operable as a positive feedback signal for generating the biased differential clock signal and as a negative feedback signal for rejecting common-mode noise in the biased differential clock signal.

\* \* \* \* \*